Feb. 21, 1956   A. T. NORDSIECK   2,735,307
MECHANICAL INTEGRATING DEVICE
Filed Dec. 24, 1951

INVENTOR.
ARNOLD T. NORDSIECK
BY
Harold J. Downes
ATTORNEY

United States Patent Office 2,735,307
Patented Feb. 21, 1956

2,735,307

MECHANICAL INTEGRATING DEVICE

Arnold T. Nordsieck, La Jolla, Calif.

Application December 24, 1951, Serial No. 263,095

8 Claims. (Cl. 74—194)

This invention relates to the mechanical process of integration, and particularly to a mechanical integrating device.

In the past, there have been available for the purpose of mechanical integration, two principal devices: One is a wheel with a sharp edge like a planimeter wheel, driven by a smooth, hard, flat, turntable. This devcie is described by Bush & Caldwell in "A New Type of Differential Analyzer," Journal of the Franklin Institute, volume 240, No. 4, October, 1945, and the other is a turntable, ball and cylinder system invented by James Thompson and described in the Proceedings of the Royal Society, volume 24, p. 262.

The first of these two devices is undesirable because as the velocity ratio is varied by varying the ratio coordinate of the point of contact of the wheel upon the turntable, the wheel must slide over the turntable perpendicular to its own plane. Unless the torque loading of the wheel is very light, this sliding is accompanied by slippage in the transmitted rotation since the sliding will take place in the direction of the resultant force and will therefore have a component giving rise to a slippage error in the transmitted rotation. The slippage of the transmitted rotation introduces errors which cannot be avoided unless only nominal torque is applied between the wheel and turntable. If only nominal torque may be transmitted between the wheel and turntable, the computing system in which the integrator is used must incorporate a torque amplifier or servo system either mechanical or electrical.

The Thompson device has no sliding motion but only pure rolling motion in its action, but it requires several bearings in addition to the essential bearings of the input and output shaft, particularly if it is necessary to apply a large thrust to the ball in order to transmit large torques. This adds to the complexity of the design and to the bearing friction which must be kept at a minimum if no torque amplification is to be used.

From the foregoing it can be seen that no presently available mechanical integrator is capable of use in a complex computer system without accompanying torque amplification or some type of servo.

It is, therefore, an object of this invention to provide a mechanical integration device which is adapted to transmit large torques.

It is another object of this invention to provide a mechanical integrating wheel which may be translated radially across a rotating turntable, without introducing slippage between the wheel and turntable.

It is another object of this invention to provide an improved mechanical integrator or precision variable velocity ratio unit.

Other objects of invention will become apparent from the following description taken in connection with the accompanying drawings in which.

Figure 2:
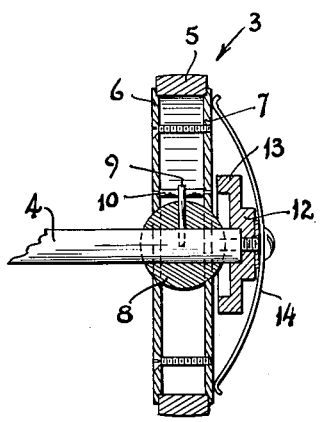
Fig. 2 is a sectional view of the integrating wheel of this invention.
Figure 3:
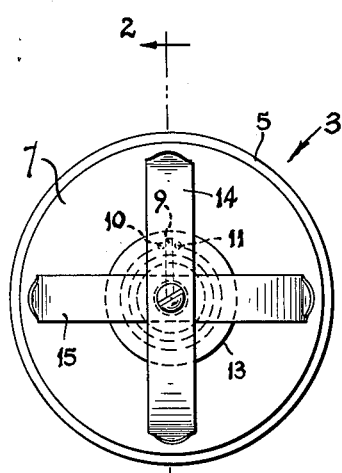
Fig. 3 is an end view of the device shown in Fig. 2.

Referring now to the drawing, there is shown an input shaft 1, a flat turntable 2, an integrating wheel 3 and an output shaft 4 attached to drive transmitter synchro 20. Integrating wheel 3 shown in Fig. 2 is comprised of an annular rim 5 having a radius equal to the distance of the outermost portion of the rim from the center line of shaft 4 and discs 6 and 7 which are machined to fit rim 5. Attached to shaft 4 is a ball 8 preferably of phosphor bronze. Ball 8 is attached to shaft 4 by means of pin 9 which extends outward from ball 8 and engages pins 10 and 11 which extend through discs 6 and 7. Motion of the pair of pins 10 and 11 relative to pin 9, in a direction parallel to pins 10 and 11, may occur freely. Ball 8 must be concentric with shaft 4. From Fig. 2 is will be noted that discs 6 and 7 are free to slide upon ball 8 so that a ball and socket joint is formed by the discs and the ball.

Attached to the end of shaft 4 is a circular collar 12 having a protruding rim 13 which serves as a stop upon the action of wheel 3. Also attached to the end of shaft 4 are leaf springs 14 and 15 which bear lightly at their ends upon the outer portion of disc 7. These springs must be sufficiently weak not to produce sliding of wheel 3 upon the turntable but must yield before such sliding occurs and yet must be strong enough to twist wheel 3 about an axis parallel to shaft 1.

Rim 5, as has been previously noted, has a radius in a plane containing any diameter of the rim and must be very smooth, accurately machined, hard, and unlubricated.

Figure 1:
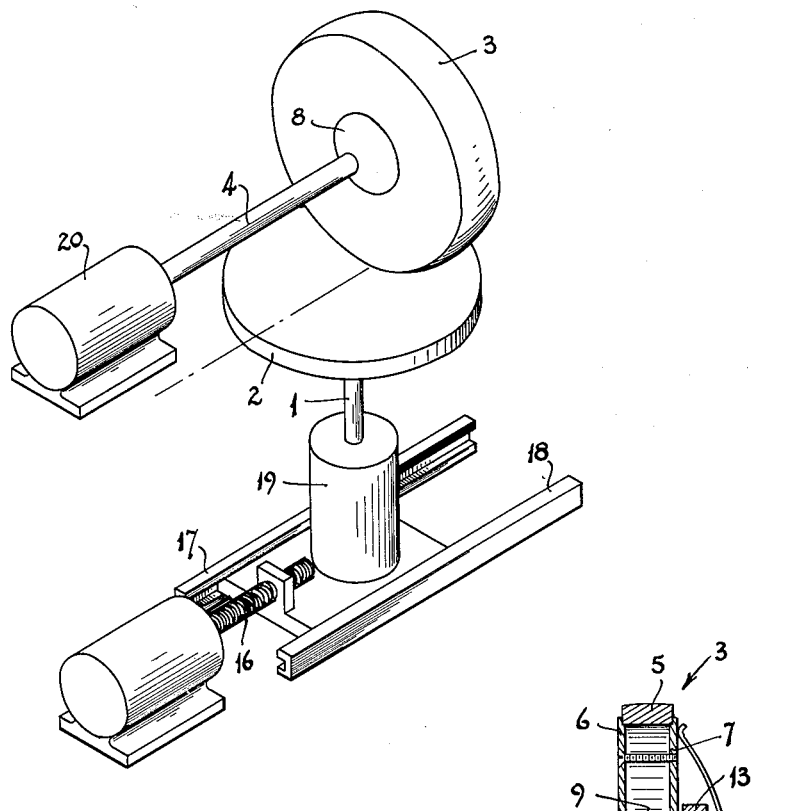
Fig. 1 is a perspective view of the invention, partly in section.

In operation, shaft 4 is made integral with the shaft which functions as an output shaft; for example, synchrogenerator 20 and is thus held in fixed bearings. Shaft 1, on the other hand, is rigidly connected for example to the shaft of a synchro motor 19 and this synchro motor is mounted for guided straight line motion normal to shaft 1. Such motion may be accomplished by a lead screw 16 and ways 17 and 18, or any other conventional means. The locus of the point of contact between turntable 2 and wheel 3 is indicated by the dotted line in Fig. 1 and intersects the axis of rotation of shaft 1. Shaft 4, as shown in Fig. 1, is oriented perfectly perpendicular to shaft 1. The distance between the point of contact of the wheel and turntable and the axis of shaft 1 is thus made accurately controllable and continuously variable. Thus, the velocity ratio between shafts 4 and 1, which is the ratio of the distance between the point of contact and the axis of shaft 1 to the radius of rim 5, is likewise accurately controllable and continuously variable. A controlled and constant amount of thrust parallel to shaft 1 is applied to the point of contact between the wheel and turntable by gravity or other means. This thrust is easily made large enough so that the tangential force of static friction at the point of contact between the wheel and turntable is sufficient to supply the torque which the integrator is required to transmit through the agency of transmitter synchro 20.

Because the rim of the wheel is part of a spherical surface, concentric with ball 8, a horizontal motion of the turntable causes wheel 3 to nutate about an axis normal both to shaft 1 and to shaft 4, since rim 5 is ground to a radius it rolls upon turntable 2 and leaves the point of contact between the wheel and turntable fixed in space. The distance between the point of contact of the wheel and the turntable and the axis of the shaft 1 is thus accurately determined and linearly related to the motion of translation of turntable 2. The effective lever arm for shaft 4 remains constant meanwhile at a value equal to the radius of rim 5. Therefore, the velocity ratio between shafts 4 and 1 is directly and accurately proportional to the translatory motion of turntable 2.

If there were a large change in the distance between the axis of shaft 1 and the point of contact between the wheel and turntable, without shaft 4 turning, wheel 3 would eventually come against stop 13 and begin to slide upon the turntable. However, in actual operation this distance varies and shaft 4 rotates simultaneously and the change in this distance per quarter revolution of shaft 4 is small compared to the radius of rim 5. Thus, the tilt, or nutation of wheel 3 introduced by the variation in the radial coordinate of the point of contact is continuously carried around by virtue of the rotation of shaft 4 and is eliminated by the action of springs 14 and 15. In operation, wheel 3 departs from perpendicularity with respect to shaft 4 by barely visible amounts.

An exception to this normal condition occurs when the wheel nears the center of the turntable since then the rate of rotation of shaft 4 is very low and the tilt of wheel 3 may accumulate considerably before it is carried around through one quarter revolution and eliminated by the springs. The width of rim 5 is preferably chosen so large and stop 13 so adjusted that wheel 3 is very rarely brought up against the stop when the wheel is brought through the central part of the turntable. An occasional contact with the stop and corresponding occasional slippage of the wheel and turntable are not serious because the error thus introduced is proportional to the fraction of the time that slippage occurs and this fraction is very small. A wheel width equal to roughly one-tenth its diameter has been found to give satisfactory results.

I claim:

1. A mechanical integrating device comprising a flat rotatable disc, means for rotating said disc about its axis of symmetry, an output shaft supported with its axis normal to and intersecting the axis of said disc, a wheel engaging the surface of said disc and having a rounded tread portion and pivotally connected to said output shaft with angular freedom with respect thereto except about the axis of said shaft, spring means for normally holding said wheel perpendicular to said shaft, and means for controllably translating said disc with respect to said wheel along the axis of said shaft while said disc is rotating, whereby the output rotation of said shaft bears the same ratio to the rotation of said disc as the distance between the axis of said disc and the point of contact between said wheel and said disc bears to the radius of said wheel.

2. A device as recited in claim 1 in which said wheel comprises an annular rim having an outside radius in a plane normal to its own plane equal to its radius in its own plane, a spherical ball attached to said shaft and means connecting said rim and said ball for allowing said rim to pivot with respect to said ball while imparting rotation to said shaft.

3. A device as recited in claim 1 in which said wheel comprises an annular rim having an outside radius in a plane normal to its own plane equal to its radius in its own plane, a spherical ball attached to said shaft, a pair of parallel circular plates attached at their periphery to either side of said rim and pivotally tangent to the surface of said sphere and pin means restraining said plates against motion with respect to said sphere.

4. A mechanical integrating device comprising a rotatable member having a flat surface means for rotating said member about a centrally disposed axis normal to said flat surface, an output shaft supported with its axis normal to and intersecting the axis of said rotatable member, a wheel engaging the suface of said rotatable member and having a tread portion shaped like a symmetrical zone of a sphere, means for pivotally connecting said wheel to said output shaft with angular freedom with respect thereto except about the axis of said shaft, spring means for normally holding said wheel perpendicular to said shaft and means for controllably translating said rotatable member with respect to said wheel along the axis of said shaft while said rotatable member is rotating, whereby the output rotation of said shaft bears the same ratio to the rotation of said rotatable member as the distance between the axis of said rotatable member and the point of contact between said wheel and said rotatable member bears to the radius of said wheel.

5. A mechanical integrating device comprising a shaft, a wheel having a rounded tread portion attached to rotate with said shaft but having yieldably restrained angular freedom with respect thereto and a rotatable body having a plane surface normal to its axis of rotation for transmitting torque to or from said wheel by frictional contact therewith whereby said body may be axially translated with respect to said shaft without slippage or loss of torque.

6. In combination a wheel having a peripheral surface approximating a symmetrical spherical zone, a shaft drivingly associated with said wheel but having yieldably restrained angular freedom with respect thereto and a disc having a plane surface engaging the periphery of said wheel and rotatable about an axis normal to said plane surface whereby torque may be transmitted between said wheel and said disc during axial movement of said shaft without slippage therebetween.

7. A mechanical integrating device comprising a wheel with an outer rim having a surface which is a zone of a spherical surface including a great circle of said sphere, a shaft, universal means for securing said wheel to said shaft, yieldable means for keeping said wheel normal to said shaft and means for frictionally driving said wheel including a plane surface whereby relative translation between said wheel and said surface along the axis of said shaft may occur while said wheel is turning without slippage between said wheel and said surface.

8. In a mechanical integrating device, a wheel with an outer rim having a surface which is a zone of a spherical surface including a great circle of said sphere, a shaft, universal means for securing said wheel to said shaft, and yieldable means for keeping said wheel normal to said shaft.

References Cited in the file of this patent

UNITED STATES PATENTS

| | | |
|---|---|---|
| 560,347 | Davis et al. | May 19, 1896 |
| 664,292 | Riddell | Dec. 18, 1900 |
| 818,747 | Cowles | Apr. 24, 1906 |
| 1,384,357 | Spencer et al. | July 12, 1921 |
| 1,861,303 | Yarman | May 31, 1932 |
| 2,285,675 | Merrick | June 9, 1942 |

FOREIGN PATENTS

| | | |
|---|---|---|
| 163,834 | Austria | Aug. 25, 1949 |
| 929,727 | France | July 22, 1947 |
| 7,780 | Great Britain | June 8, 1901 |
| 7,569 | Great Britain | Aug. 12, 1912 |
| 274,579 | Italy | Mar. 26, 1930 |